United States Patent [19]

Neiss

[11] 4,318,704
[45] Mar. 9, 1982

[54] LOG ROLLING APPARATUS

[76] Inventor: Earl J. Neiss, 620 S. Eckard Rd., Dalton, Ohio 44618

[21] Appl. No.: 210,581

[22] Filed: Nov. 26, 1980

[51] Int. Cl.³ .............................................. B31C 1/00
[52] U.S. Cl. .................................... 493/307; 493/462
[58] Field of Search .............. 493/307, 304, 303, 462, 493/967, 464; 242/67.1 R; 44/2, 11

[56] References Cited

U.S. PATENT DOCUMENTS

| | | | |
|---|---|---|---|
| 1,831,062 | 11/1931 | Frederick | 493/307 |
| 3,958,499 | 5/1976 | Albee, Jr. | 493/307 |
| 4,039,299 | 8/1977 | Porter et al. | 493/307 X |
| 4,068,564 | 1/1978 | Dahlstrom | 493/462 |
| 4,192,226 | 3/1980 | Agostinelli | 493/307 X |
| 4,248,414 | 2/1981 | Rovin et al. | 493/462 X |

FOREIGN PATENT DOCUMENTS 445112  4/1936  United Kingdom ................ 493/307

Primary Examiner—James F. Coan
Attorney, Agent, or Firm—Harvey B. Jacobson

[57] ABSTRACT

A log rolling apparatus includes a body having a depression or well positioned therein and a large sheet of canvas or similar flexible material positioned over the body and the well. The canvas is fixedly attached to respective ends of the body and a dual link pivotal member is provided to which is attached a roller movable between the body and the canvas. Sheets of flammable material and optionally other burnable material, such as leaves or the like, may be placed within the well over the top surface of the canvas, and the pivotal member may then be rotated about the body in a manner which causes the canvas to attempt to follow the roller attached to the member, thus causing the top surface of the canvas to slide against itself so as to roll up the flammable sheet material into a log shape with the leaves, if used, enclosed by the sheet material.

8 Claims, 4 Drawing Figures

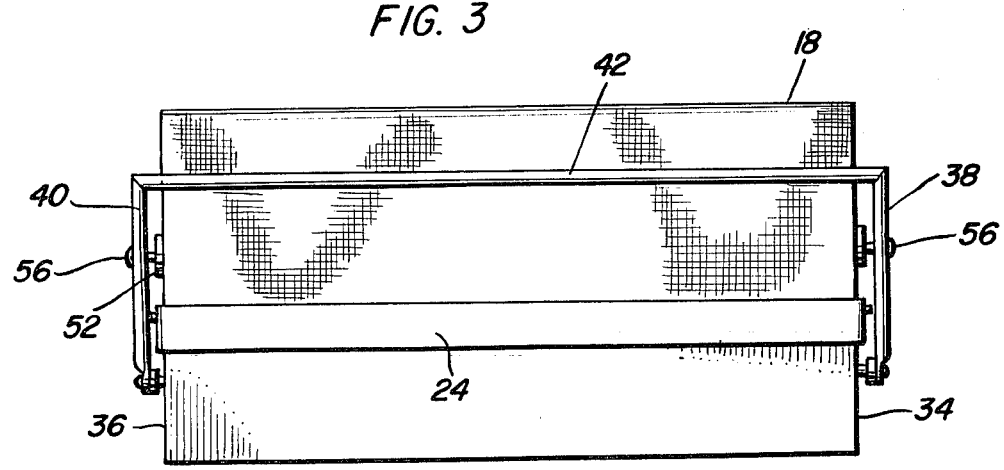
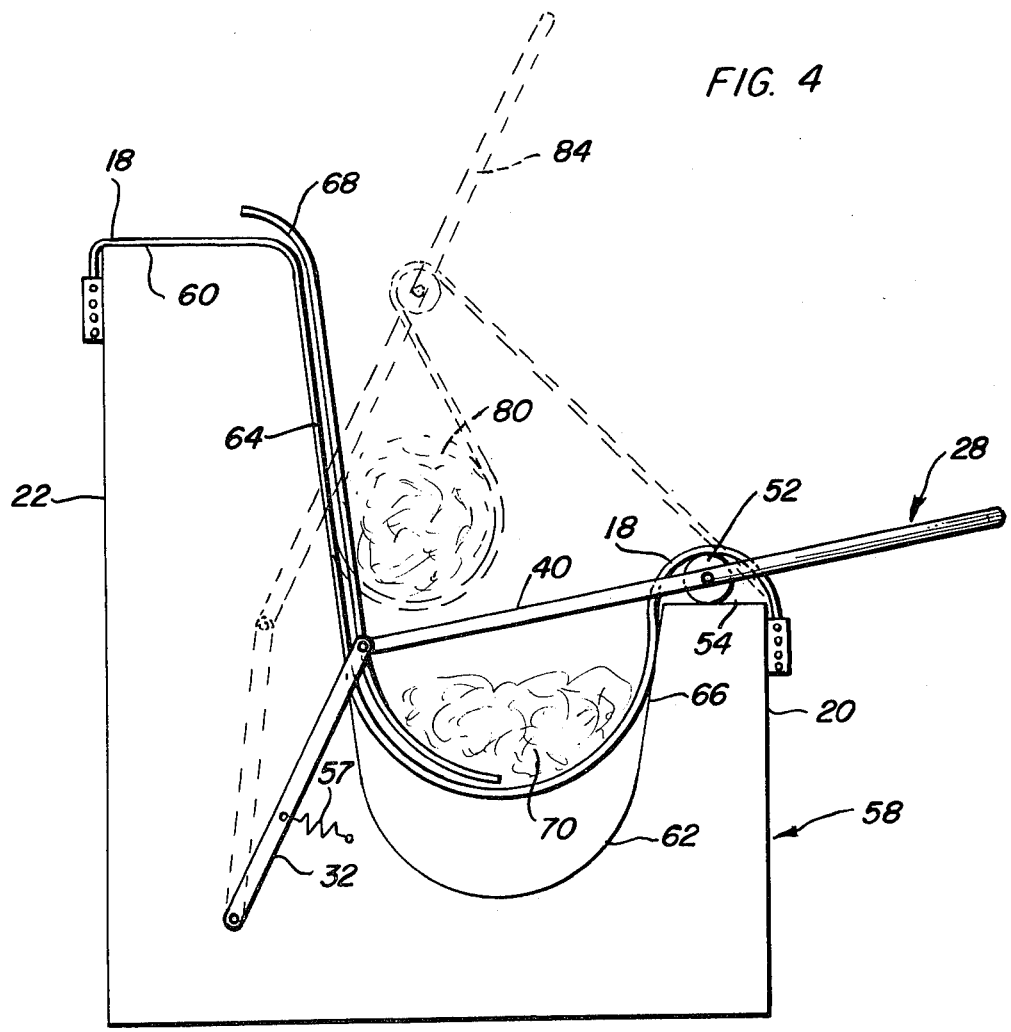

LOG ROLLING APPARATUS

BACKGROUND OF THE INVENTION

1. Field of the Invention

The present invention relates to devices for rolling sheet materials and particulate burnable material, such as leaves or the like, into tubular shapes, and more particularly pertains to a log rolling apparatus which permits sheets of flammable material, such as newspapers or the like, to be rolled into log shapes so as to facilitate a burning thereof.

2. Description of the Prior Art

It is generally well known to take sheets of flammable material, such as newspapers or the like, and to roll the same into compact, tight log shapes for the purpose of burning them in fireplaces. For example, U.S. Pat. No. 3,958,499, issued to P. Albee, Jr. on May 25, 1976, illustrates a newspaper log maker which effectively consists of a pair of vertical standards having circular bearings at their upper ends, and a main shaft positioned between the bearings and rotatable in response to a crank arm attached thereto. A clamp bar is formed as a portion of the main shaft so that an edge of a newspaper may be clamped thereto, and the shaft may then be rotated manually through the use of the crank arm, so as to roll a plurality of newspapers into a log shape. While this construction does facilitate the manufacture of newspaper logs, it inherently possesses the disadvantage of not being able to roll logs which include the use of flammable materials that are not in sheet form. Further, the Albee, Jr. device requires a disassembly thereof each time a log is rolled, since it is necessary to remove the main shaft so that the newspaper log can be removed therefrom.

Similarly, U.S. Pat. No. 4,039,299, issued to C. Porter et al on Aug. 2, 1977, discloses a device for the manufacture of paper fire logs which includes the use of a shallow open top tank having a liquid contained therein and an axially slotted shaft removably positioned between opposed walls of the tank. Sheets of paper may be directed into the axial slot of the shaft and the same may then be rotated so as to draw the paper through the liquid and around the shaft into a log shape. Further, the Porter et al device employs both manual and powered rotation means for the shaft and, as with Albee, Jr., the shaft must be removed from the apparatus in order to remove a paper fire log therefrom. Additionally, the construction of the Porter et al device only permits a winding of sheet material upon the rotatable shaft and no means are provided for winding materials thereon which are not of a sheet-like construction. As such, there still exists a need for manufacturing fire logs in a manner which includes the use of non-sheet-like flammable material in combination with flammable sheets.

SUMMARY OF THE INVENTION

The general purpose of the present invention, which will be subsequently described in greater detail, is to provide a log rolling apparatus that has all of the advantages of the priorly employed log rolling apparatuses and none of the disadvantages. To attain this, the present invention makes use of a curvilinearly-shaped body member having a depression or well portion formed therein and a sheet of canvas or similar material positioned completely over the body member and extending into the well, such sheet of material being fixedly attached at two opposed edges thereof in the position described. A pair of arms extend along the other two opposed sides of the body and are integrally attached together by a handle portion fixedly secured to remote ends of the arms. Further, the arms are of a multi-link construction and are pivotable about the body member along the sides thereof. Additionally, a roller is fixedly secured between the pair of arms at a position remote from and in substantial parallel alignment with the handle portion. In this respect, the roller lies between the body member and the canvas and is rotatable relative thereto in response to a pivotable movement of the arms along the sides of the body member. The multi-link construction of the arms permits an effective variation in their respective lengths, so as to facilitate movement of the roller along the body member at variable distances about the pivot points of the arms to the body. As such, it is not necessary that the roller be at a constant distance, i.e., radius, from its pivotable attachment points to the body member. Sheets of flammable material may be positioned within the well portion of the body member and then other flammable materials which are not in sheet form, such as leaves, corn fodder, and the like, may be deposited upon the flammable sheets prior to pivoting the arms along the sides of the body member.

As can be appreciated then, a pivotal movement of the arms along the sides of the body member results in the roller tending to pull the canvas away from the body member. However, due to the attachment of the canvas to respective ends of the body member, the canvas can only roll along across itself in a manner which results in the sheets of flammable material, along with the other flammable materials positioned thereon, being rolled into a log shape suitable for burning in a fireplace or the like.

It is therefore an object of the present invention to provide a log rolling apparatus which has all of the advantages of the priorly employed log rolling apparatuses and none of the disadvantages.

It is another object of the present invention to provide a log rolling apparatus which may be easily and economically manufactured.

It is a further object of the present invention to provide a log rolling apparatus which eliminates the need for a rotatable shaft about which flammable sheet-like materials are to be rolled.

Still another object of the present invention is to provide a log rolling apparatus which may be utilized to roll flammable materials which are not in sheet-like form into log shapes.

Yet another object of the present invention is to provide a log rolling apparatus which may be quickly operated to roll flammable materials into a log shape.

Even another object of the present invention is to provide a log rolling apparatus which is much simpler to operate than the log rolling apparatuses employed in the prior art.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 is a transverse end view of the embodiment shown in FIG. 1.

FIG. 4 illustrates a second embodiment of the log rolling apparatus forming the present invention.

DESCRIPTION OF THE PREFERRED EMBODIMENTS

Figure 1:
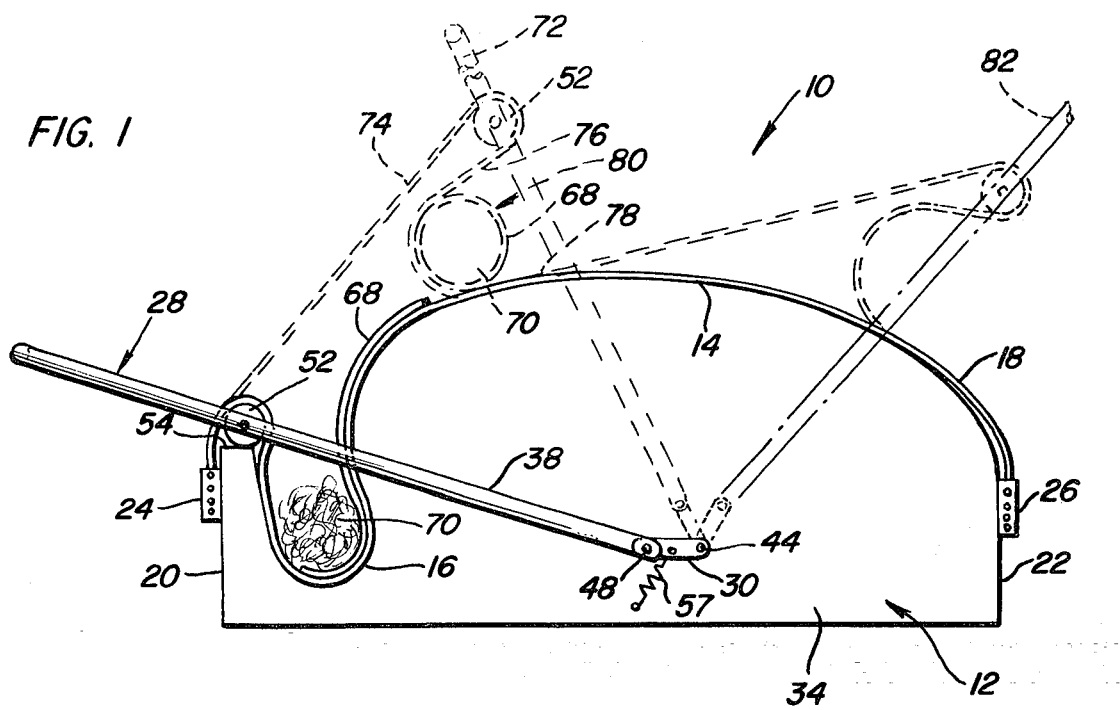
FIG. 1 is a side elevational view of one embodiment of the log rolling apparatus forming the present invention.

With reference now to the drawings and in particular to FIG. 1, a log rolling apparatus incorporating the principles and concepts of the present invention and generally designated by the reference numeral 10 will be discussed in detail. Specifically, FIG. 1 shows the log rolling apparatus 10 as including a body member 12 having a topmost curved surface 14 extending over a substantial portion of the body member, and further including a depression or well 16 formed therein as an integral part thereof. Further illustrated is the use of a sheet of canvas 18, or other flexible material, which is comformingly positioned in an overlying relationship across the body member 12 including the topmost curved surface 14 and the well 16. In this respect, the canvas 18 is fixedly secured to opposed ends 20, 22 of the body member 12 through the use of respective attachment means 24, 26. The attachment means 24, 26 are of a conventional construction and are designed to operate in a manner which permits the canvas sheet 18 to be adjusted in length, whereby the amount of canvas overlying the body member 12 can be controlled as desired.

Figure 2:
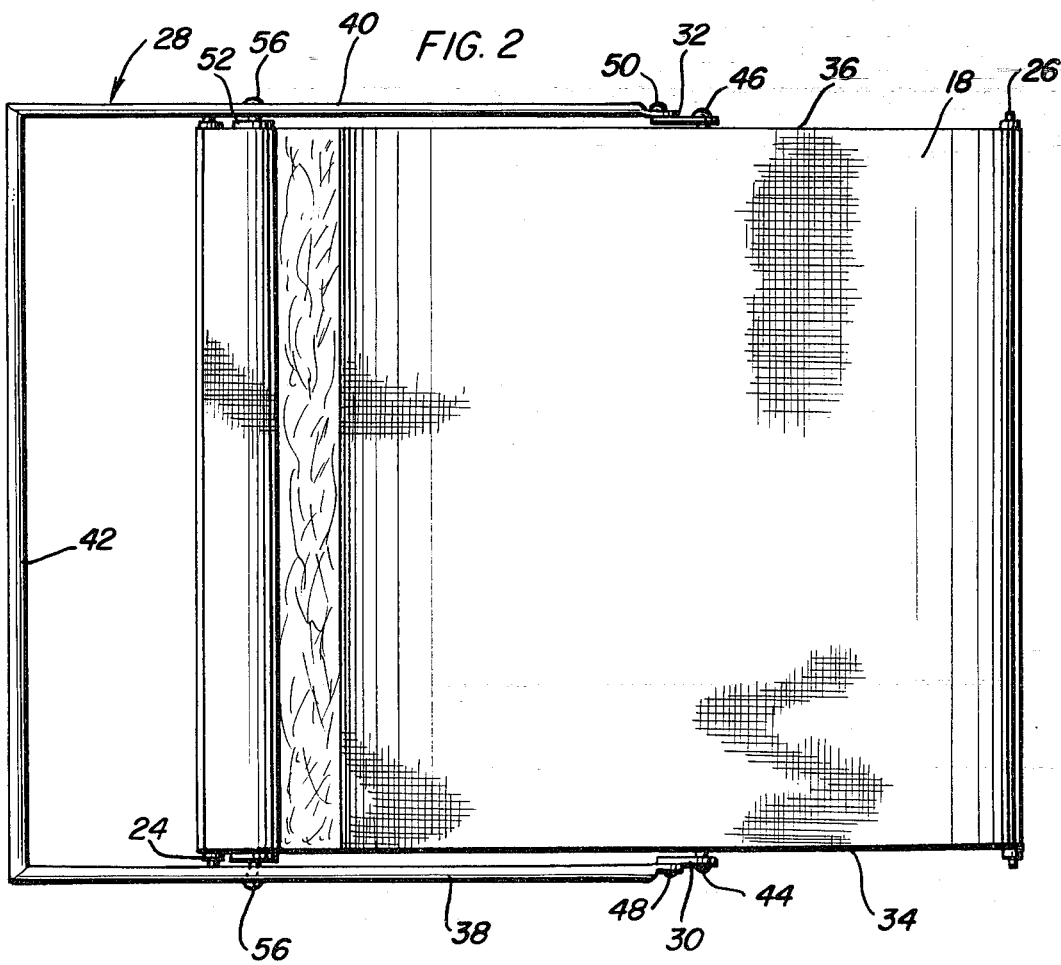
FIG. 2 is a top plan view of the embodiment of the present invention illustrated in FIG. 1.

Viewing FIGS. 1 and 2 together, it can be seen that the log rolling apparatus 10 further includes a rotation member 28 which is formed from a pair of first pivot arms 30, 32 pivotally attached to opposed sides 34, 36, respectively, of the body member 12 and second pivot arms 38, 40 respectively pivotally attached to the pivot arms 30, 32. Additionally, the second pivot arms 38, 40 are connected together through the use of a handle member 42 in the manner illustrated in FIG. 2. In this connection, it can be seen that the first pivot arms 30, 32 respectively pivot about pivot points 44, 46, while the second pivot arms 38, 40 are respectively pivotally attached to the first pivot arms at pivot points 48, 50.

As is further evident with reference to FIGS. 1–3, the rotation member 28 also includes a roller 52 which is normally positionable on a flat support surface 54 formed as a part of the body member 12 and which is rotatably attached between the second pivot arms 38, 40 in the manner most clearly illustrated in FIG. 2. In this connection, the roller 52 is rotatably positioned on a roller shaft 56 fixedly secured to the second pivot arms 38, 40, while spring 57 is provided which is attached between the body member 12 and the pivotable arm 30 so as to facilitate a return of the rotation member 28 to the position shown in FIG. 1.

As can be further ascertained with reference to FIGS. 1–3, the roller 52 is positioned on the log rolling apparatus 10 in a manner whereby it lies between the canvas 18 fixedly secured to the body member 12 and the uppermost surface of the body member 12 per se, to include the topmost curved surface 14 as well as the surface associated with the well 16. Also, clearly shown in FIGS. 2 and 3 is the fact that the canvas 18 extends substantially across the entire transverse width of the body member 12 so as to essentially entirely cover the roller 52, the well 16 and the topmost curved surface 14.

FIG. 4 has been provided to illustrate a second slightly modified embodiment of the present invention which differs only in the structural form of the body member 58. In this respect, the body member 58 functions in the same manner as the body member 12 illustrated in the embodiment of FIG. 1 with the exception that the topmost curved surface 14 of the FIG. 1 embodiment has been replaced by a topmost flat surface 60. To support this configuration, the well 62 has a first side portion 64 which is of a substantially greater length than a second side portion 66 associated with the other side of the well. This construction differs to some degree from the construction of FIG. 1 and accordingly, the embodiment of FIG. 4 can be operated by a user with somewhat less movement than that required by the first embodiment above described. As can be appreciated, the other elements associated with the log rolling apparatus 10 illustrated in FIG. 4 are essentially the same as those disclosed in the embodiment of FIG. 1, including a roller 52 positioned on a flat surface 54 and located between a canvas 18 fixedly secured to respective ends 20, 22 of the body member 58. Further, a rotation member 28 is provided which includes the use of the same first pivot arms 30, 32, as well as second pivot arms 38, 40. As such, the embodiments of FIGS. 1 and 4 are closely related in structure and are functionally operable in the exact same manner.

With respect to the operation of the present invention and with reference to FIG. 1, it can be seen that the log rolling apparatus should initially be provided with the rotation member 28 in the position illustrated, wherein the roller 52 is resting between the canvas 18 and the flat support surface 54. A user may then position a sheet of material 68, which typically might consist of a sheet of newspaper or the like, in the manner illustrated whereby the sheet 68 partially extends into the well portion 16, as well as overlying a portion of the topmost curved surface 14. As desired then, any type of flammable material 70 may be positioned in the well 16 so that the same fills a substantial portion of the well and partially overlies the sheet 68. At this point of the operation then, a user need only to grip the rotation member 28, preferably by the handle 42, and then rotate the same about the pivot point 44 in the manner indicated in phantom lines in FIG. 1. Specifically, it can be seen that a movement of the rotation member 28 to a first intermediate position 72, as shown in phantom lines, results in a rolling up of the sheet of material 68 due to the cross surface translational movement of the canvas 18 caused by the securing of the canvas to the body member 12 through use of attachment means 24. At this point, it can be appreciated that the roller 52 facilitates the movement of the rotation member 28 in the manner described since canvas portion 74, also indicated in phantom lines, increases in length during the rotational movement of the member 28, such increase in length being afforded by the canvas slidably rolling across the roller 52. As such, the canvas portions 76 and 78 lying proximate to the sheet material 68 move in opposite directions relative to one another so as to afford a rolling effect on the sheet. As can be further appreciated with reference to FIG. 1, the rolling of the sheet 68 into a cylindrical shape results in the flammable material 70 becoming permanently captured therein whereby a log 80 is created which is suitable for burning in a fireplace or the like. By the same token, it should noted that the multi-link construction of the arms of the rotation member 28 permits the distance between the shaft 56, which is the axis of rotation of the roller 52, and the arm pivot points 44, 46 to vary so as to accommodate the rolling movement of the roller over the surface 14 of the body member 12. In this respect, the multi-link construction permits the arm lengths to vary so that it is not necessary to construct the body member surface 14 in a perfectly circular shape, which would otherwise be required if the arm lengths were not variable.

Once the rotation member 28 as been rotated about the pivot point 44 to the position 82, also illustrated in phantom lines, it can be seen that the rolling operation has been completed so that the log 80 may be removed from the log rolling apparatus 10. The return spring 57 will then operate to assist the user in returning the rotation member 28 to the "at rest" position shown in FIG. 1, whereby a new sheet of material 68 may be inserted in the well 16 preparatory to making another log 80. Of course, the embodiment of FIG. 4 operates in essentially the same manner as that above described with reference to the embodiment of FIG. 1. In this regard, it can be seen that a rotation of the member 28 about the embodiment of FIG. 4 will create a similar log 80 once the member has been moved to the phantom position 84, and a continued rotation thereof will result in the log being positioned ready for removal on the topmost flat surface 60.

With respect to the above embodiments described, it can be understood that the optimum dimensional relationships for the parts of the invention are deemed readily apparent and obvious to one skilled in the art, and all equivalent relationships to those illustrated in the drawings and described in the specification are intended to be encompassed by the invention, subject only to limitations specifically appearing in the claims. In this connection, the types of materials as well as the structural configurations of the parts may take many different forms. For example, the present invention could be utilized to roll exclusively sheets of material into logs, such as logs which are constructed entirely of newspaper, while the flammable material 70 positionable within sheets 68 of newspapers or the like, might be wood chips, corn fodder, leaves, etc. Further, it can be appreciated that the sheets 68 might be formed from materials other than newspapers, such as cloth, plastics, etc.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. An apparatus for rolling various materials into log shapes, said apparatus comprising:
   a body member;
   well means positioned in said body member for receiving said materials therein;
   flexible cover means positioned over said body member and said well means, said cover means being fixedly secured at edges thereof to said body member; and
   rotation means pivotally attached to said body member and being operable to cause a translational movement of said flexible cover means across said body member, whereby opposed portions of a top surface of said cover means slidably move in opposite directions relative to one another to effect a rolling of said materials into a log shape.

2. The apparatus for rolling various materials into log shapes as defined in claim 1, wherein said flexible cover means is conformingly positioned within said well means and over a top surface of said body member.

3. The apparatus for rolling various materials into log shapes as defined in claim 1, wherein said rotation means includes a pair of pivotal members positioned on opposite sides of said body member, said pivotal members being pivotally attached at one end thereof to respective sides of said body member and further having a roller means positioned therebetween and extending over a top surface of said body member.

4. The apparatus for rolling various materials into log shapes as defined in claim 3, wherein said roller means extending across said top surface of said body member is positioned between said top surface and said flexible cover means.

5. The apparatus for rolling various materials into log shapes as defined in claim 4, wherein said pivotal members are further joined together by a handle means extending therebetween.

6. The apparatus for rolling various materials into log shapes as defined in claim 5, wherein said pivotal members are each respectively comprised of at least two pivotally connected links thereby to facilitate the overall rotation of the pivotal members about the body member.

7. The apparatus for rolling various materials into log shapes as defined in claim 2, wherein said cover means includes the use of a sheet of canvas material.

8. An apparatus for rolling various materials into log shapes, said apparatus comprising:
   a body member having a curved upper surface;
   well means positioned in said body member for receiving said materials therein;
   flexible cover means conformingly overlying said body member and said well means, said cover means being constructed of a canvas-like material and being fixedly secured at opposed edges thereof to said body member; and
   rotation means pivotally attached to said body member and being operable to cause a translational movement of said canvas-like material across said body member whereby opposed portions of a top surface of said canvas-like material slidably move in opposite directions relative to one another to effect a rolling of said materials into a log shape, said rotation means including a first pair of links respectively pivotally attached on opposite sides of said body member and further including a second pair of links respectively pivotally attached at free ends thereof to said first pair of pivotal links, said second pair of pivotal links being connected together through the use of a roller means extending substantially across said top surface of said body member and lying between said top surface of said body member and said canvas-like material whereby said rolling of said materials into a log shape occurs in response to a movement of said roller means across said top surface of said body member.

* * * * *